Figure 1:
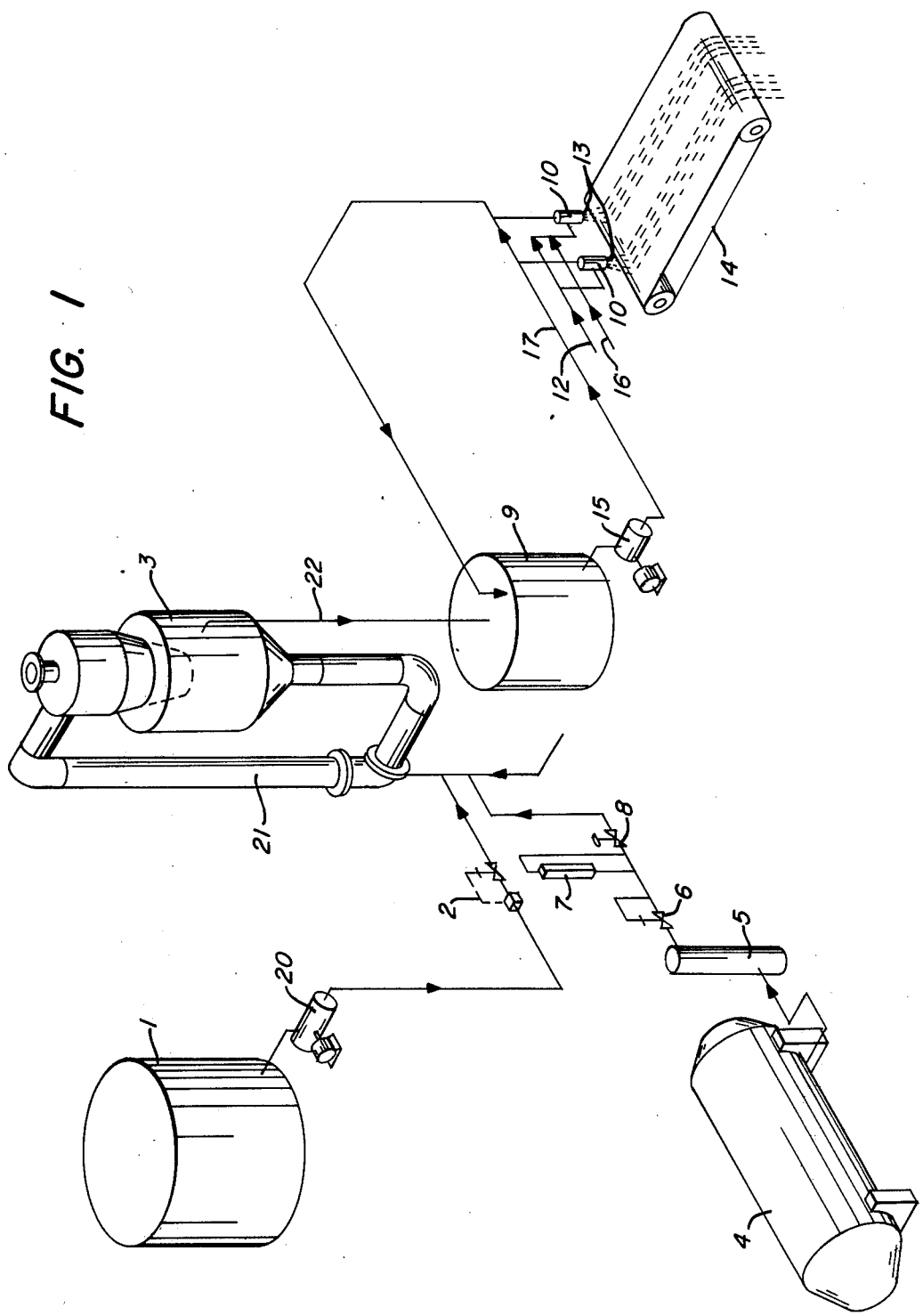

United States Patent [19]

Hudson et al.

[11] 4,009,245
[45] Feb. 22, 1977

[54] PROCESS FOR THE MANUFACTURE OF MONOAMMONIUM PHOSPHATE

[75] Inventors: John W. Hudson; Robert A. Pendergrast, both of Atlanta, Ga.

[73] Assignee: United States Steel Corporation, Pittsburgh, Pa.

[22] Filed: Feb. 28, 1975

[21] Appl. No.: 554,298

[52] U.S. Cl. .............................. 423/313; 23/259.1; 71/34; 71/43; 71/64 DB
[51] Int. Cl.² .................. C05B 19/00; C01B 25/28
[58] Field of Search .............. 71/1, 34, 43, 64 DB; 423/275, 305, 310, 313, 396; 252/182; 23/259.1

[56] References Cited
UNITED STATES PATENTS

| | | | |
|---|---|---|---|
| 2,902,342 | 9/1959 | Kerley, Jr. | 71/43 X |
| 3,226,184 | 12/1965 | Brownlie | 71/43 X |
| 3,415,638 | 12/1968 | Hemsley et al. | 71/640 B |
| 3,419,378 | 12/1968 | Kearns | 71/34 |
| 3,539,327 | 11/1970 | Hudson | 71/34 |
| 3,544,298 | 12/1970 | Fitz-William, Jr. | 71/34 |
| 3,563,723 | 2/1971 | Sackett, Sr. et al. | 71/34 |
| 3,734,708 | 5/1973 | Burns | 71/34 |

*Primary Examiner*—Charles N. Hart
*Assistant Examiner*—Ferris H. Lander
*Attorney, Agent, or Firm*—William L. Krayer

[57] ABSTRACT

A novel process for making monoammonium phosphate includes a pre-neutralizing step, a pipeline reactor step, and the projection of a stream of reactants from the pipeline reactor onto a moving belt, to result in a foamed, dry friable product.

16 Claims, 2 Drawing Figures

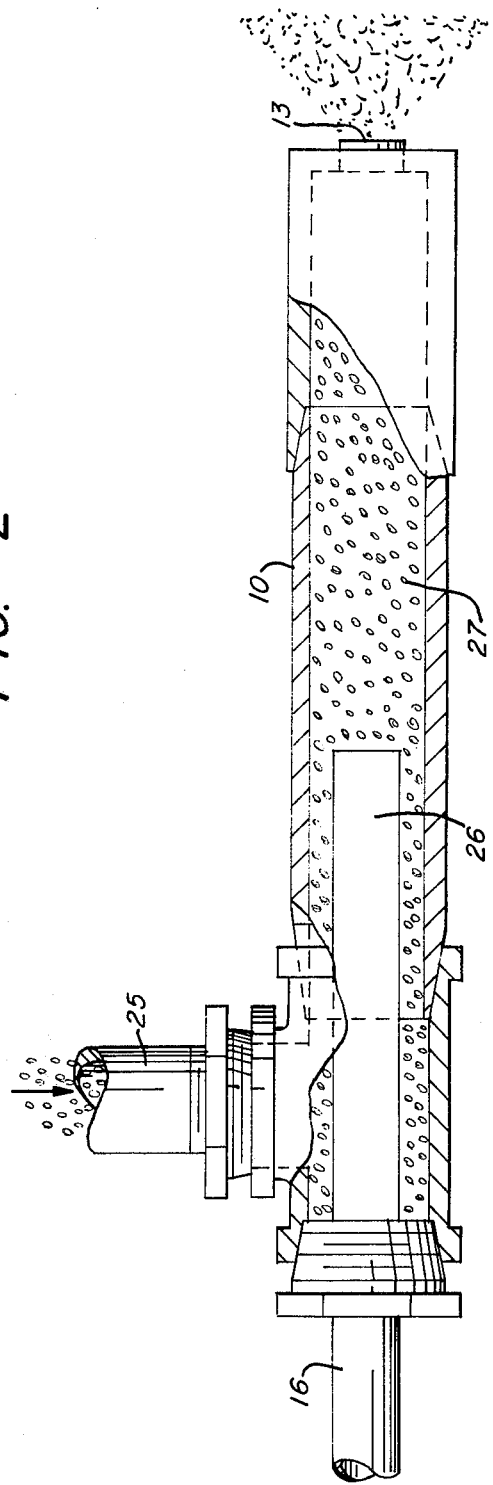

PROCESS FOR THE MANUFACTURE OF MONOAMMONIUM PHOSPHATE

BACKGROUND OF THE INVENTION

Monoammonium phosphate, hereafter called MAP, is commonly made buy neutralizing orthophosphoric acid ($H_3PO_4$) with ammonia ($NH_3$) at an N/P mole ratio of 1.0, as follows:

$$NH_3 + H_3PO_4 \rightarrow NH_4H_2PO_4 \quad (\Delta H) = -32 \text{ kcal/mol}.$$

This reaction is generally carried out in the presence of sufficient water to make a mobile fluid of the reaction medium. Since more heat is evolved than necessary to raise the resultant mixture to its boiling point, excess heat is utilized to drive off some of the water. Where concentrated acid feedstock is used, water must be added if formation of polyphosphates if to be avoided.

The more important methods of making MAP are summarized below, but not necessarily in order of commercial significance. Pertinent patents are listed in Table IV.

The slurry process developed by Achorn et al. U.S. Pat. No. 3,153,574, has been in commercial use for more than fifteen years. Crude MAP by this process is commonly known as 11-48-0 in the fertilizer industry and is generally made from wet-process merchant-grade acid (54% $P_2O_5$) and ammonia. The limited solubility of MAP requires a relatively large percentage of water to keep the viscosity of the resulting slurry low. The hot slurry is mixed in a drum granulator with a high rate of recycle of previously granulated MAP. Recycle rates of 20:1 or more are not exceptional for this material but are usually 5:1 at the lowest. The large quantity of water necessary for granulation requires that the granular MAP be dried in a gas-fired rotary dryer. Granulated MAP from this process is too dense, making it undesirable for further ammoniation in fertilizer processes because of its low reactivity. In recent years, several companies have developed proprietary spray processes to avoid the troublesome granulation process. The Hemsley et al method, U.S. Pat. No. 3,415,638, uses a pressurized neutralizer opening at 30 pounds per square inch gauge to neutralize merchant-grade phosphoric acid with ammonia to a 1.0 N/P mole ratio in a single stage. The resultant slurry is sprayed into a void tower and collects as tiny prills at the bottom of the tower, or optionall (Example IV) is sprayed onto a moving belt.

Kearns, U.S. Pat. No. 3,419,378, neutralizes wet-process acid with ammonia in a single-stage reactor. The mostly liquid reacting mixture emerges instantly from a nozzle and is sprayed into a tower. Excess ammonia is required to complete the ammoniation to 1.0 N/P mole ratio, and the waste ammonia must be recovered from the spray tower.

Scottish Agricultural Industries developed a process called "Phosai", British Pat. No. 951,476, to neutralize phosphoric acid to a mole ratio of 1.4 N/P in a pre-neutralizer. The resultant slurry is pumped to a pugmill where the slurry is acidified to 1.0 N/P ratio with additional phosphoric acid. This reaction is carried out in the presence of sufficient recycle to keep the mass of materials in good mechanical condition. The granules are dried in a rotary dryer.

The Swedish firm of A. B. Forenade Superfosfatfabrik developed a process in which phosphoric acid was sprayed into an ammonia atmosphere. The heat of reaction is sufficient to evaporate the water from the ammonium phosphate particles, provided an acid of sufficient strength is used. Heat deficiencies in certain phosphoric acids used for this process are made up by adding sulfuric acid; however, the product then contains a mixture of ammonium phosphate and ammonium sulfate. The product from this process is such a fine powder that it is impractical to use in normal fertilizer granulation plants.

The reader may also be interested in U.S. Pat. Nos. 3,053,622, 3,902,342, 3,310,371, 3,502,441, 3,539,327, 2,890,934, 3,238,021, 3,019,099, 3,130,033, 3,179,496, 3,375,063, 3,730,700, and British Pat. No. 1,081,296.

SUMMARY OF THE INVENTION

The present invention was developed to fill the need for a more efficient method of manufacture of non-granular ammonium phosphate, to provide a more reactive product, and to allow the use of a wide variety of commerical phosphoric acids, in particular so-called sludge acids containing up to 30% solids. The process consists of three distinct operations.

It will be discussed in two parts — first, a variation in which an initial reaction involves an excess of phosphorus over the 1:1 mole ratio of the orthophosphates, and second a variation having an excess of nitrogen in the initial reaction, thus requiring a later introduction of additional phosphorus. This later introduction of additional phosphorus is accomplished by the injection of phosphoric acid into a chamber containing the initial reactants and having an orifice directed through the atmosphere toward a moving belt. In the first variation the 1:1 or other desired ratio of N/P is achieved by the injection of ammonia into the same chamber. The variation involving an initial excess of phosphorus and requiring the addition of ammonia will be discussed first.

In this variation, phosphoric acid is optionally reacted with part of the ammonia in a pre-neutralizer at a 0.2–0.9 N/P mole ratio, preferably 0.6 – 0.8 N/P. The heat of reaction raises the temperature of the mixture to boiling, and part of the water of the phosphoric acid is evaporated. This reaction can be carried out in any conventional neutralizer equipment. However, we prefer the special neutralizer reactor described by J. W. Hudson in U.S. Pat. No. 3,502,441. The pre-neutralized slurry from this reactor is preferably collected in a surge vessel. The description of this patent is incorporated herein by reference.

Second, the slurry is pumped from the surge vessel to a mixing tee, sometimes known as a pipeline reactor. In this reactor, sufficient ammonia vapor is added to complete the reaction to about a 1.0 N/P mole ratio. Steam is also added along with the ammonia vapor to aid in preventing solids from caking on the reactor walls.

Third, the superheated (about 350° F) solution from the tee reactor is directed to impinge upon a conveying system such as an endless belt placed about 6 to 36 inches, preferably 12 to 18 inches, from the restricting orifice at the end of the pipeline reactor. The belt is positioned in such a way as to move perpendicularly to the axis of discharge from the pipeline reactor at a rate of about 100 feet per minute.

When the superheated stream of MAP solution emerges from the restricting orifice, it expands in a circular pattern, 12–15 inches in diameter, and produces a foam-like cake on the moving belt. As it moves downstream on the belt, it solidifies rapidly, forming a highly porous, easily friable material within about 36 inches from the point of impact. As the belt turns around the end roller, the MAP is hard enough to flake off the belt.

Thus, it will be seen that my invention includes a method of making ammonium phosphate having a mole ratio of N:P of about 0.7:1 to about 1.5:1 comprising (a) generating a slurry by reacting ammonia with phosphoric acid in a mole ratio of N:P of from about 0.2:1 to 0.9:1 under agitation of the heat of reaction; (b) reacting said slurry with additional ammonia to produce a reactant mixture having a mole ratio of N:P of from about 0.7:1 to about 1.5:1; and (c) passing the reactant mixture, while still undergoing an exothermic reaction, through at least one orifice onto a surface.

Typical compositions of feed acids containing solids, pre-neutralizer slurries, and products of this variation are shown in Table I. Other types of conveying equipment, such as rotating drums, discs, etc., with and without cooling, can be used in place of the belt conveyor.

the storage tank 4 is passed through the vaporizer 5 at the autogenous pressure of the ammonia storage vessel. A regulator 6 reduces the gas pressure to 65 pounds per square inch gauge. After passing through a measuring by-pass rotameter 7, the ammonia flow is regulated by a manual valve 8 to the pre-neutralizer at a rate proportional to the acid flow to yield a mole ratio of 0.2 to 0.9 N/P. As described in Hudson U.S. Pat. No, 3,502,441 the reaction takes place mainly in reaction leg 21 and a slurry collects in pre-neutralizer 3.

The N/P ratio is controlled in such a way that the resulting slurry has a freezing point between 100° and 200° F, preferably 150°–160° F, and also retains a low enough viscosity to be pumpable.

Overflow from the pre-neutralizer 3 is discharged through line 22 to a surge vessel 9 from which it is pumped by pump 15 through line 17 to the pipeline reactors 10. There, the slurry in line 17 is mixed with additional ammonia in line 16, and steam in line 12. The superheated slurry is then discharged through orifice 13 to impinge on a moving belt 14 at a distance from 6 to 36 inches, preferably 12 to 18 inches.

In FIG. 2, the pipeline reactor may be seen to include

Table I

| | Process Stream Compositions | | | | | | | | | | |
|---|---|---|---|---|---|---|---|---|---|---|---|
| | Feed Acid | | | Pre-neutralizer Slurry | | | | MAP Product $P_2O_5$ | | | |
| Test No. | Solids (%) | $P_2O_5$ (%) | $H_2O$ (%) | N (%) | $P_2O_5$ (%) | $H_2O$ (%) | N/P (M.R.) | N (%) | Total (%) | $H_2O$ Soluble (%) | $H_2O$ (%) | N/P (M.R.) |
| 1-A | 15.00 | 46.32 | 19.4 | 6.34 | 48.47 | 6.30 | .66 | 8.44 | 49.07 | 46.60 | 2.22 | .87 |
| 1-B | 15.05 | 45.92 | 19.4 | 5.89 | 49.03 | 9.05 | .61 | 8.74 | 49.59 | 46.18 | 1.01 | .89 |
| 1-C | 17.55 | 45.44 | 19.0 | 6.31 | 45.66 | 6.36 | .70 | 8.29 | 47.60 | 44.39 | 1.53 | .88 |
| 2-A | 17.04 | 44.48 | 18.2 | 5.89 | 46.62 | 8.59 | .64 | 8.30 | 47.96 | 44.63 | 1.06 | .88 |
| 2-B | 17.84 | 45.35 | 18.1 | 5.33 | 44.97 | 8.62 | .60 | 7.48 | 47.43 | 45.07 | 3.68 | .80 |
| 2-C | 17.24 | 44.56 | 18.2 | 5.43 | 46.55 | 8.99 | .59 | 8.38 | 47.70 | 44.61 | 2.62 | .89 |
| 3-A | 18.29 | 45.21 | 18.3 | 5.59 | 45.94 | 8.34 | .61 | 7.78 | 47.62 | 44.39 | 2.20 | .83 |
| 3-B | 17.36 | 44.38 | 18.2 | 5.44 | 45.68 | 8.13 | .60 | 8.06 | 48.07 | 44.25 | 1.77 | .85 |
| 3-C | 18.16 | 44.88 | 19.0 | 5.09 | 42.68 | | .60 | 8.36 | 48.45 | 44.47 | 1.11 | .87 |
| 4 | 25.7 | 41.24 | 19.5 | 4.07 | 41.31 | 13.5 | .50 | 8.12 | 43.77 | — | 1.98 | .94 |
| 5 | 1.0 | 53.6 | 18.1 | 6.87 | 52.5 | — | .66 | 10.74 | 53.7 | — | — | 1.01 |

The process achieves two unexpected improvements over conventional methods. In contrast to air-spraying or prilling of an MAP solution in a tower, our process provides a more efficient utilization of the ammonia and a better drying performance of the product. The foamed product, due to the sponge-like structure, retains ammonia gas until it is fully reacted, and simultaneously utilizes a large portion of the heat of reaction for the evaporation of water, since heat loss to the surrounding air is less than in a spraying or prilling operation. In other words, the exposed surface area of the foamed product is less than that of fine prills, and the amount of air contact is less.

Typical values of improved ammonia efficiency are equivalent to a 5–25% reduction in ammonia requirement when compared to air spraying. The improved water evaporation is demonstrated by a reduced moisture level in the product, usually about 2 percentage points (see Table III).

Operation of this process may be followed by referring to the attached drawings, in which FIG. 1 is a more or less diagrammatic view of the entire system, and FIG. 2 is a side sectional view of the preferred pipeline reactor.

Referring to FIG. 1, phosphoric acid is pumped by pump 20 from a storage tank 1 through a magnetic flowmeter 2 to the lower end of reaction leg 21 of pre-neutralizer 3. Simultaneously liquid ammonia from slurry inlet 25, reactant inlet 26, reaction chamber 27 and nozzle or outlet orifice 13. Slurry and steam entering through inlet 25 from the pre-neutralizer flows turbulently towards orifice 13, is mixed and reacts with the phosphoric acid or ammonia from reactant inlet 26, and finally exits still reacting, through outlet orifice 13.

The distance between the orifice and the belt is important, since it controls the density of the product as may be seen in Table II. Even greater distances form an increasingly denser product. The ammonia efficiency is also affected by the belt distance — the shorter the distance, the better the ammonia utilization.

Table II

Effect of Belt Distance on Product Density

| | | Product Density | |
|---|---|---|---|
| Test No. | Belt Distance (inches) | Poured (lb/ft³) | Loosely Packed (lb/ft³) |
| 1-A | 28 | 37.1 | 39.2 |
| 1-B | 28 | 34.9 | 35.7 |
| 1-C | 28 | 32.7 | 33.8 |
| 2-A | 12 | 32.7 | 36.1 |
| 2-B | 12 | 45.0 | 46.8 |
| 2-C | 12 | 43.0 | 44.4 |
| 3-A | 36 | 44.3 | 44.7 |
| 3-B | 36 | 45.4 | 44.0 |
| 3-C | 36 | 43.0 | 44.7 |

Belt velocities are not very critical; however, best results were obtained when the belt was operated at such a velocity that a 2 to 3 inch thick cake was produced. At 6–7 tons per hour production, this required a belt velocity of about 100 feet per minute. In general, a minimum of about 3 seconds is required for the foamed slurry to solidify.

The light, flaky product separates readily from the belt as the product reaches the turn roller. Crushing and grinding of the material is readily accomplished because of the cellular nature of the product.

The improved thermal efficiency and the better ammonia utilization of the belt process was demonstrated by producing an air-sprayed product and a belt product alternately from the same acid. In this test, MAP was produced through a movable spray nozzle which could be rotated, without interruption of the process, to discharge either onto the moving belt or into a spray chamber. A comparison of the two products, as listed in Table III, shows that the belt-produced material contained less moisture.

All test runs were performed with the equipment train shown in FIG. 1, using anhydrous, gaseous ammonia which we prefer to liquid forms. A summary of feed acid and product compositions is listed in Table I. Test 2-A will be described as a typical example.

EXAMPLE I

Wet-process sludge acid containing 44.48% $P_2O_5$ and 17.04% solids was pumped into the pre-neutralizer at a rate of 18 gallons per minute, together with gaseous ammonia, 17.9 pounds per minute, to give a reaction slurry containing a mole ratio of N/P of 0.64. The generated steam was vented from the reactor, reducing the water content of the slurry to 8.59% $H_2O$, as determined by the Karl Fischer method. The resulting slurry had a freezing point of 165° F. It was pumped from the surge vessel to the pipeline reactor where it was reacted with additional ammonia at such a rate to give a dry product when discharged on the moving belt. The belt was positioned at 12 inches distance from the discharge orifice, and operated at a velocity of 100 feet per minute. Composition and bulk density of the product is listed in Tables I and II.

During part of the test, the discharge nozzle was rotated to spray into a large collection chamber where the product accumulated as fine prills. In order to produce non-caking prills, the ammonia rate at the pipeline reactor had to be nearly doubled because of less efficient ammonia utilization. When the operation was reverted to the regular belt method, the ammonia rate at the pipeline reactor could be reduced to approximately one-half the setting without causing caking.

This procedure was repeated several times with the same result.

The monoammonium phosphate process can also be operated with an excess of ammonia (N/P>1) in the pre-neutralizer followed by addition of phosphoric acid instead of ammonia at the pipeline reactor. In other words, all ammonia is introduced at the first reactor. This process modification achieves a 100% ammonia efficiency but usually yields a product with a higher moisture level than that of the process recited above.

In this modified operation, phosphoric acid (35–55% $P_2O_5$) is reacted with gaseous ammonia in a neutralizer such as neutralizer (3) in FIG. 1 at a N/P mole ratio of 1.2–1.8, preferably 1.3–1.5. The heat of reaction raises the temperature of the mixture to boiling, and part of the water is evaporated. If highly concentrated phosphoric acid such as 50–55% $P_2O_5$ acid is used, additional water (i.e. about 5% to 40% of the gross weight of the acid) should be added to the neutralizer to prevent solidification of the reactor charge.

As in the reaction described in Example I, the neutralization can be carried out in any conventional reactor; however, we prefer the special neutralizer reactor described by J. W. Hudson in U.S. Pat. No. 3,502,441.

The neutralized ammonium phosphate slurry is discharged to a surge tank 9 from which it is pumped to a pipeline reactor 10 where phosphoric acid (35–55% $P_2O_5$) is added to adjust the N/P mole ratio to 1.0. Steam is also introduced into the pipeline reactor to prevent scale formation and plugging of the reactor. The superheated slurry is then discharged through an orifice to impinge on moving belt 14.

The apparatus is identical to that used for the variation with an excess of phosphoric acid, and the process is the same except for the N/P ratios and the introduction of phosphoric acid through line 16.

It is advantageous for phosphoric acids containing only 35–45% $P_2O_5$ to preheat the acid to 180°–220° F prior to introduction into the pipeline reactor to provide more heat for the evaporation of water during the subsequent discharge onto the belt.

The advantage of the 1.2–1.8 N/P neutralization method lies in the quantitative ammonia utilization. Since all ammonia is introduced at the neutralizer reactor and none at the pipeline reactor, a quantitative recovery of ammonia is possible. The reason for the difference in reactor efficiency is the residence time. The neutralizer reactor provides a residence time of at least several minutes and thorough mixing by the rapid recirculation. By contrast, the residence time in the pipeline reactor is only a fraction of a second, and mixing is less thorough than in the neutralizer reactor.

Table III

| | Comparison of Drying Efficiency | | | | | | | |
|---|---|---|---|---|---|---|---|---|
| | Belt Product | | | | Air-Sprayed Product | | | |
| Test No. | $H_2O$ (%) | N (%) | $P_2O_5$ (%) | N/P (M.R.) | $H_2O$ % | N % | $P_2O_5$ % | N/P (M.R.) |
| 1-A | 2.22 | 8.44 | 49.07 | 0.87 | 3.43 | 8.61 | 47.90 | 0.91 |
| 1-B | 1.01 | 8.74 | 49.59 | 0.89 | 2.03 | 9.75 | 47.88 | 1.03 |
| 1-C | 1.53 | 8.29 | 47.60 | 0.88 | 3.38 | 9.81 | 46.20 | 1.08 |
| 2-A | 1.06 | 8.30 | 47.96 | 0.88 | 3.39 | 9.43 | 46.06 | 0.98 |
| 2-B | 3.68 | 7.48 | 47.43 | 0.80 | 3.59 | 8.77 | 46.76 | 0.95 |
| 2-C | 2.62 | 8.38 | 47.70 | 0.89 | 3.75 | 8.41 | 46.20 | 0.84 |
| 3-A | 2.20 | 7.78 | 47.62 | 0.83 | 3.72 | 8.38 | 51.04 | 0.83 |
| 3-B | 1.77 | 8.06 | 48.07 | 0.85 | 2.32 | 9.01 | 46.61 | 0.98 |
| 3-C | 1.11 | 8.36 | 48.45 | 0.87 | 4.58 | 8.13 | 46.27 | 0.89 |

This variation of our invention is seen to include several test runs with the equipment train as shown in FIG. 1 except that phosphoric acid was introduced through line (16) instead of ammonia. Phosphoric acid was pumped from the storage tank 1 through a magnetic flowmeter 2 to the pre-neutralizer 3. Simultaneously, liquid ammonia from the storage tank 4 was passed through the vaporizer 5 at the autogenous pressure of the ammonia storage vessel. A regulator 6 reduced the gas pressure to 65 pounds per sqaure inch gage. After passing through a measuring by-pass rotameter 7, the ammonia flow was regulated by a manual valve 8 to the neutralizer at such a rate to yield a mole ratio of 1.3 to 1.5 N/P. The temperature in the neutralizer ranged from 250° to 260° F. With acids containing more than 50% $P_2O_5$, water was added to prevent the temperature from exceeding 260° F. The resulting mixture discharged through the overflow to a surge vessel 9 from which it was pumped to the pipeline reactor 10 where additional acid 16 was introduced to give a 1.0 N/P mole ratio. Steam was provided at a rate of 100–250 lb. per ton of product. The superheated slurry was then discharged through the orifice 13 to impinge on a moving belt 14 at a distance from 6 to 36 inches, preferably 12 to 18 inches.

Typical process data and the compositions of the neutralizer slurry and the final product are listed in Table IV.

Table IV

| | Feed Rate, lb./min. | | | Process Data and Stream Compositions (ATC 329-5-1) | | | | | | | |
|---|---|---|---|---|---|---|---|---|---|---|---|
| | | | | Neutralizer Discharge | | | | Product | | | |
| Acid | Ammonia | Water | Steam | % N | % $P_2O_5$ | % $H_2O$ | N/P,M.R. | % N | % $P_2O_5$ | % $H_2O$ | N/P,M.R. |
| 1.53[1] | 0.253 | — | 0.20 | 12.85 | 43.65 | 8.21 | 1.49 | 11.39 | 53.69 | 6.59 | 1.07 |
| 1.53[2] | 0.253 | .308 | 0.20 | 12.65 | 42.88 | 10.08 | 1.49 | 10.47 | 47.08 | 18.02 | 1.12 |

[1] 51.07% $P_2O_5$
[2] 48.00% $P_2O_5$

The most important improvements of our belt process over conventional MAP processes are as follows:
1. Flexibility to use various types of phosphoric acids, ranging from furnace acid to black sludge acids containing up to 30% solids.
2. Ammonia losses greatly reduced.
3. Control of fume emission facilitated since only a small area and volume of air needs to be controlled.
4. Improved thermal efficiency which provides a drier product or, as another alternative, allows the use of a more dilute feed acid.
5. Improved reactivity of the product due to the cellular nature of the material, which provides a greater surface area for reaction when used for granular fertilizer production.
6. No citrate-insoluble phosphate formed in the process.
7. Ease of process control. The appearance of the MAP on the belt provides instantaneous information of process performance.
8. No recycle necessary, allowing high production rates.
9. Lower capital costs.

We do not intend to be restricted to the above specific examples and illustrations; our invention may be otherwise variously practiced within the scope of the following claims.

We claim:
1. Method of making ammonium phosphate having a mole ratio of N:P of about 0.7:1 to about 1.5:1 comprising
   a. generating a slurry by reacting ammonia with phosphoric acid in a mole ratio of N:P of from about 0.2:1 to 0.9:1 under agitation of the heat of reaction;
   b. reacting said slurry with additional ammonia to produce a reactant mixture having a mole ratio of N:P of from about 0.7:1 to about 1.5:1; and
   c. passing the reactant mixture, while still undergoing an exothermic reaction, through at least one orifice onto a surface, said surface being located from about 6 to about 36 inches from said orifice to thereby produce a highly porous, easily friable ammonium phosphate product.
2. Method of claim 1 in which the reactants are cooled on said surface and recovered as a dry, friable product.
3. Method of claim 2 in which the surface is flexed to remove the product.
4. Method of claim 1 in which the surface is a moving belt.
5. Method of claim 1 in which the surface is a moving belt located about 12 to about 18 inches from said orifice and moving at a rate such that the deposit on the belt is from 0.5 to 10 inches deep.
6. Method of claim 1 in which the ammonia is in gaseous form.
7. Method of claim 1 wherein the reaction of ammonia and phosphoric acid is conducted in the presence of steam.
8. Method of claim 1 wherein the reaction of ammonia and the slurry is conducted in the presence of steam.
9. Apparatus for producing a non-granular ammonium phosphate having a mole ratio of N:P of from about 0.7:1 to about 1.5:1 comprising (a) a pre-neutralizer means for reacting ammonia with phosphoric acid under agitation from the heat of reaction to produce an ammonium phosphate slurry having either an excess of nitrogen or an excess of phosphorous over or under the N:P mole ratio of 1:1; (b) a pipeline reactor means for reacting said slurry with either additional ammonia or additional phosphoric acid to produce a final reactant mixture having an N:P mole ratio of from about 0.7:1 to about 1.5:1; (c) nozzle means associated with said pipeline reactor means through which said final reactant mixture is passed while said mixture is still undergoing an exothermic reaction; and (d) a moving surface means located from about 6 to about 36 inches from said nozzle means upon which said final reactant mixture is deposited and dried to produce a light, flaky foamed and easily friable product.
10. Apparatus as in claim 9 additionally comprising crushing and grinding means for crushing and grinding said easily friable product which is removed from said surface means.
11. Apparatus of claim 9 including means for supplying ammonia and phosphoric acid to the pre-neutral- izer means, means for conveying the slurry made therein onto said pipeline reactor means, and means for supplying ammonia or phosphoric acid to said pipeline reactor means.

12. Method of making ammonium phosphate having a mole ratio of N:P of about 0.71:1 to about 1.5:1 comprising
   a. generating a slurry by reacting ammonia with phosphoric acid in a mole ratio of N:P of from about 1.2:1 to 1.8:1 under agitation of the heat of reaction;
   b. reacting said slurry with additional phosphoric acid to produce a reactant mixture having a mole ratio of N:P of from about 0.7:1 to about 1.5:1; and
   c. passing the rectant mixture, while still undergoing an exothermic reaction, through at least one orifice onto a surface, said surface being located from about 6 to about 36 inches from said orifice to thereby produce a higly porous, easily friable ammonium phosphate product.

13. Method of claim 12 in which the surface is a moving belt.

14. Method of claim 12 in which the surface is a moving belt moving at a rate such that the deposit on the belt is from 0.5 to 10 inches deep.

15. Method of claim 12 in which the initial ratio of N:P is 1.3:1 to 1.5:1.

16. Method of making ammonium phosphate having a mole ratio of N:P of about 0.8:1 to 1.2:1 comprising
   a. generating a slurry by reacting ammonia with phosphoric acid in a mole ratio of N:P of from about 1.35 to about 1.45 under agitation of the heat of reaction;
   b. reacting said slurry with phosphoric acid to produce a reactant mixture having a mole ratio of N:P of from about 0.8:1 to about 1.2:1; and
   c. passing the reactant mixture, while still undergoing an exothermic reaction, through at least one orifice onto a surface, said surface being located from about 6 to about 36 inches from said orifice to thereby produce a highly porous, easily friable ammonium phosphate product.

* * * * *